No. 689,125. Patented Dec. 17, 1901.
J. REID & E. HAMMANN.
WATER CLOSET.
(Application filed Feb. 15, 1897.)
(No Model.)

UNITED STATES PATENT OFFICE.

JOHN REID, OF YONKERS, AND EDWARD HAMMANN, OF BROOKLYN, NEW YORK, ASSIGNORS TO THE J. L. MOTT IRON WORKS, OF NEW YORK, N. Y., A CORPORATION OF NEW YORK.

WATER-CLOSET.

SPECIFICATION forming part of Letters Patent No. 689,125, dated December 17, 1901.

Application filed February 15, 1897. Serial No. 623,382. (No model.)

*To all whom it may concern:*

Be it known that we, JOHN REID, of Yonkers, in the county of Westchester, and EDWARD HAMMANN, of Brooklyn, in the county of Kings, State of New York, citizens of the United States, have invented an Improvement in Water-Closets, of which the following is a specification.

The present invention relates to water-closets of the general class represented in Letters Patent No. 411,520, granted September 24, 1889, and in which it sometimes occurs that the bowl or basin of the closet is not properly sealed by the water therein in consequence of the siphon action being started by a bucket of water poured suddenly into the bowl and emptying the trap, or the trap may have too little water, in consequence of flushing-water ceasing too soon; and the present invention provides a chamber in the closet into which flushing-water flows and from which the water runs slowly, in order that there may be a sufficient quantity of water passing into the basin after the siphon action ceases to reliably seal or trap the waste-pipe at its junction with the basin.

Figure 1:
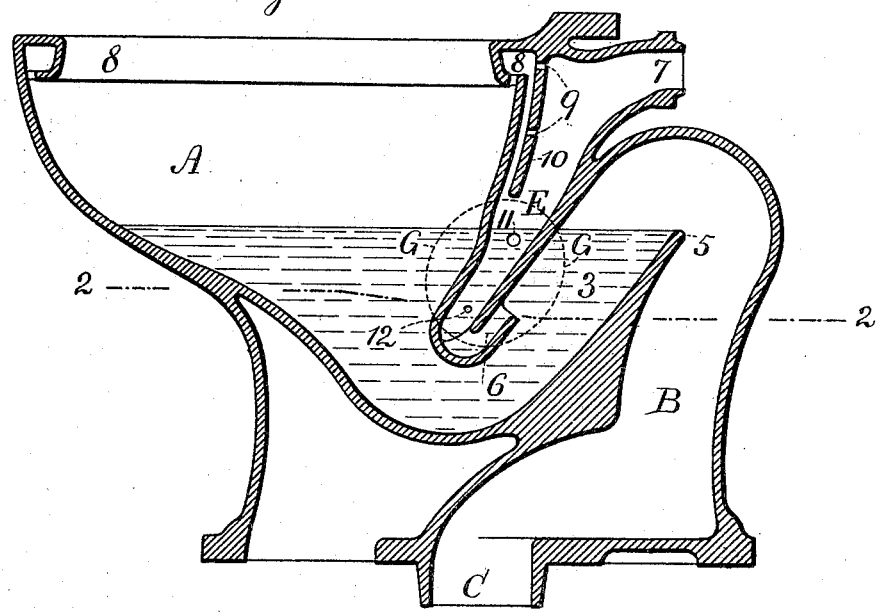
Figure 2:
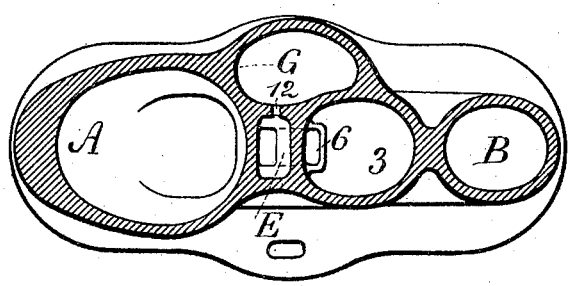

In the drawings, Figure 1 is a vertical section of the improved closet, and Fig. 2 is a sectional plan at the line 2 2 of Fig. 1.

The bowl A is provided with a flushing-rim 8, and the waste-pipe B extends down to the connection C for the soil-pipe, there being a dam 5 for retaining the proper quantity of water in the uptake-pipe 3 and in the bottom of the bowl A, and the flushing-water is supplied by a pipe from any suitable cistern connected to the branch 7 at the rear of the closet in any desired manner.

The waterway E descends from the supply-pipe and branch 7 and terminates at the lower end with an upward-curved ejector 6, and this ejector 6 is sufficiently below the level of the dam 5 for the rush of water issuing from such ejector to carry the water up over the dam 5 and produce a siphon action that empties the bowl with great rapidity, carrying the contents over the dam 5 and through the waste-pipe B in the manner similar, or approximately so, to that in the aforesaid patent.

The water is allowed to pass from the waterway E into the flushing-rim 8, and there is a partition 10, which descends from the upper part of the closet and within the waterway, and there are holes 9 in such partition, and the flushing-rim is provided with openings in its lower side for the water to flow over the interior surface of the basin or bowl, as usual.

At one side of the bowl and adjacent to the waterway E is a chamber G, which may be of any desired size or shape, and there are openings 11 and 12 through the wall of the waterway E into such chamber G, and the lower opening 12 is advantageously smaller than the upper opening 11, and the chamber G being below the level of the dam 5 is normally full of water, or nearly so, as the two openings allow water to run in and the air to escape.

The operation of this closet when in use is that the primary rush of the flushing-water drives the air out through the channel between the bowl and the partition 10 and causes the ejector 6 to start the siphoning action, as aforesaid, and the water also rushes through the channel and the openings 9 into the flushing-rim 8, and from such flushing-rim the water flows over the interior surface of the bowl to thoroughly moisten the same. The contents of the bowl are rapidly discharged by the waste-pipe B, and when the supply of flushing-water from the cistern is ample the siphoning action is broken as soon as the air passes freely into the uptake 3, and the water flows into the bowl, filling the same up to the level of the dam 5; but should the siphoning action continue too long or the supply of water be inadequate to fill up the bowl to the ordinary level the water from the chamber G will flow through the opening 12 and fill up the trap of the bowl, so as effectually to prevent the passage of gases from the sewer into the bowl, and water will also be retained in the trap formed by the ejector 6, and gases cannot escape through the chamber G or the waterway E in consequence of the water retained in the said trap of the ejector, even if the water in the trap of the bowl does not extend up to the edge of the ejector. Hence the closet cannot remain unsealed in consequence of an inefficient supply of water from the flushing-cistern or from any prolonged siphonic or suction action in the waste-pipe, and in cases where a bucket of water or slops is poured rapidly into the closet-bowl there is sufficient water in the chamber G to run into the closet-trap and seal the same after the siphonic action has ceased.

If the waterway E were not provided with the partition 10, the air in the lower part of the waterway, below the lateral opening from the waterway to the flushing-rim, would be driven off through the ejector, the water in the trap making an objectionable noise. In consequence of providing the partition 10 the air in the waterway E has a free escape through the flushing-rim, because the lower end of the partition 10 is but little above the water-line in the trap, and the noise from air escaping through water is prevented.

In all cases where the trap is filled to the normal level the chamber G fills simultaneously to the same level, the air escaping from the chamber through the upper hole 11, and the water in this chamber becomes an emergency-supply to prevent the trap remaining unsealed in case of prolonged siphonic action or of siphonic action independent of the flushing-supply from the cistern.

The closet constructed as aforesaid is advantageously made in one piece, of porcelain, including the chamber G; but we do not limit ourselves in this particular.

We claim as our invention—

1. The water-closet bowl having a descending flushing-waterway and an upwardly-directed ejector, a waste-pipe and a dam over which the contents of the bowl are forced by the action of the ejector, a chamber for water adjacent to the flushing-waterway and below the level of the water in the trap, so as to normally remain substantially full and a small opening from the waterway into the chamber for allowing the chamber to fill or the water to run from the chamber into the traps of the ejector and of the bowl, substantially as set forth.

2. A water-closet of porcelain having a bowl, waste-pipe and flushing-waterway integral, an upward-acting ejector at the lower end of the flushing-waterway for carrying the contents of the bowl over the dam of the waste-pipe, a chamber adjacent to the ejector and below the level of the water in the trap so as to normally remain substantially full and having an upper and a small lower opening into the waterway for the escape of air and the passage of water from the chamber into the traps of the ejector and of the bowl, substantially as set forth.

3. The water-closet of porcelain having a bowl, an integral waste-pipe and flushing-waterway, a flushing-rim and a downwardly-extending partition between the flushing-waterway and the escape air-channel and waterway to the flushing-rim and an upward-acting ejector at the lower end of the flushing-waterway, substantially as set forth.

4. The water-closet of porcelain having a bowl, an integral waste-pipe and flushing-waterway, a flushing-rim and a downwardly-extending partition and openings to the flushing-rim, and an upward-acting ejector at the lower end of the flushing-waterway, a chamber at one side of the flushing-waterway and openings into the same from such flushing-waterway, substantially as set forth.

Signed by us this 9th day of February, 1897.

JOHN REID.
EDWARD HAMMANN.

Witnesses:
GEO. T. PINCKNEY,
S. T. HAVILAND.